July 29, 1969  A. R. SCOTT  3,458,068
VEHICLE TOWING DOLLY AND CASTOR ASSEMBLIES
Filed June 12, 1967  4 Sheets-Sheet 1

INVENTOR:
Albert R. Scott
by
Cecil C. Kent
Atty

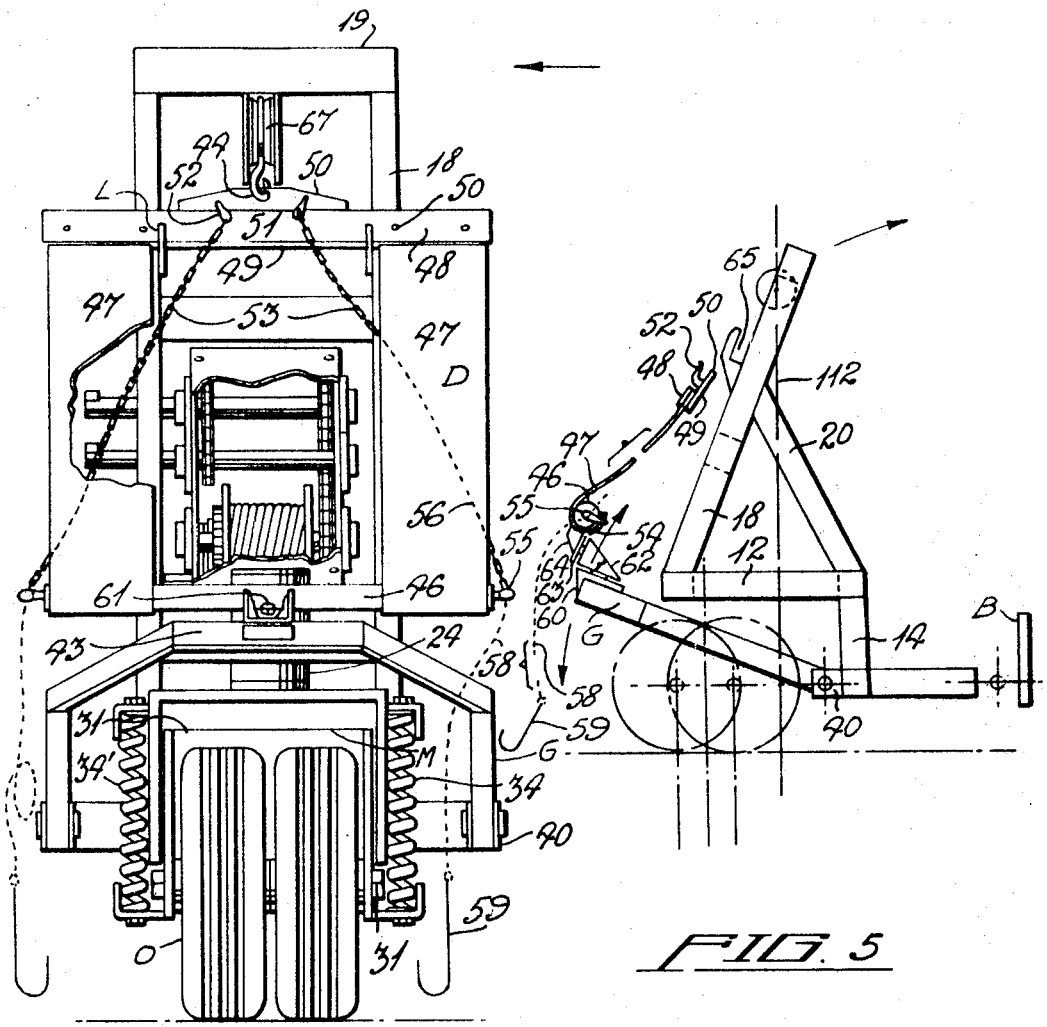

July 29, 1969  A. R. SCOTT  3,458,068
VEHICLE TOWING DOLLY AND CASTOR ASSEMBLIES
Filed June 12, 1967  4 Sheets-Sheet 3

INVENTOR:
Albert R. Scott
by:
Cecil C. Kent
Atty

July 29, 1969 A. R. SCOTT 3,458,068
VEHICLE TOWING DOLLY AND CASTOR ASSEMBLIES
Filed June 12, 1967 4 Sheets-Sheet 4

INVENTOR:
Albert R. Scott
by:-
Cecil C. Kent
Atty

United States Patent Office 3,458,068
Patented July 29, 1969

3,458,068
VEHICLE TOWING DOLLY AND CASTOR ASSEMBLIES
Albert Rockwood Scott, Toronto, Ontario, Canada, assignor to Rockwood Equipment Company, a partnership
Filed June 12, 1967, Ser. No. 645,408
Int. Cl. B66c *1/00;* B60d *1/00*
U.S. Cl. 214—86                                      19 Claims

ABSTRACT OF THE DISCLOSURE

A lifting and towing dolly attachable at one end to a towing vehicle. The dolly includes framework, a sling assembly, winch and cable means for actuating the sling assembly and a rotatable ground engaging castor. The entire dolly can be elevated to an out-of-use position by the winch and cable means by cooperating with a sheave on the towing vehicle.

---

The present invention relates to a novel vehicle towing dolly and a novel castor assembly for use in association therewith or otherwise, an object of the invention of which the novel castor assembly forms a part being to provide a much improved means and method for towing disabled vehicles, the dolly being particularly adapted and designed for low cost manufacture and hence wide usage being in addition, very light in weight as a result of all of which it may be easily connected to a pair of spaced conventional towing hitches secured to the rear end of a light truck, a Land Rover, a stationwagon or an ordinary passenger car.

It is a further novel feature of the present invention so to adapt the conventional lifting and towing sling assembly to the novel dolly herein disclosed, with the addition to the foregoing advantages, of the ability to connect and disconnect a disabled vehicle with respect to the dolly with conspicuous ease and speed, and to lift one end thereof by high and low speed means in the form of a sling assembly and yoke cable winch assembly on and forming part of the dolly.

A still further and highly important and novel feature of the present invention resides in means, that is to say, the herein disclosed yoke in combination with the conventional sling assembly utilized, whereby the sling assembly may be retained and secured in convenient out-of-use position, and, when lowered and connected to a disabled vehicle may be raised with the assistance of the guiding yoke through a limited rotary path which follows approximately the inclination of the dolly superstructure, all to the end that as soon as the towing vehicle pulls away with the towed vehicle following, the ground wheel framework supporting assembly (or castor assembly) will rotate instantly toward the rear where it remains in very close proximity to the leading lifted end of the towed vehicle and practically underneath the same so that the main weight thereof is in advance, or on the leading side of the castor wheel or wheels of the dolly whereby as much weight as possible is transmitted to the towing vehicle but with, in fact, a very desirable dynamic distribution of weight during travel, as between the wheel supported end of the disabled vehicle, the dolly and the towing vehicle.

A still further important advantageous, useful novel feature of the present invention resides in the self contained, aforesaid winch means by the use of which, in combination with the structure to be disclosed, the complete dolly may very easily be winched up clear of the ground when not in use, so that it may be transported clear of the road, with the novel castor assembly in this condition swivelling 180° toward the towing vehicle to the rear of which it is attached, from the position assumed when it is towing a vehicle, to the end that the leverage is reduced while being transported ground-free as stated.

Further novel features of the invention, reside in the construction and design thereof which permits the lowering of the rear tail-gate of a service truck, without obstruction by the dolly which is a consideration of considerable convenience on the job. Another and important feature resides in the fact that with the castor assembly occupying the forward position when lowered to ground after being raised, or after having been backed up toward a disabled vehicle, there is more room to work and make connection between the dolly and the towed vehicle, than there is when the castor assembly has swung into the rearward position which, as already indicated, occurs immediately the towing vehicle pulls away.

It is a further novel feature of the present invention to provide a dolly of such simple and inexpensive construction as to obviate the necessity for the purchase of a towing vehicle by many individuals, concerns and particularly service stations, whose scope of operations do not really justify the expense thereof, but are nonetheless virtually obliged to keep such a vehicle for occasional use, with all the inconvenience and expense caused by the permanent installation, as in an ordinary service truck, of a crane and winch mechanism.

Another very important novel feature of the present invention resides in the provision of the tow means by which a very large part of the weight of the disabled vehicle is transferred to the adjacent end of the towing vehicle, and which means comprises firstly arranging the sheaving system entirely upon the leading side of the dolly, with respect to the ground contacting point of the castor wheel supporting assembly, with a primary sheave at the apex of the dolly such that, particularly in the two-away position of said ground wheel castoring assembly the weight of the vehicle is transferred to such primary sheave so as to exert a downwardly rotary or over balancing effort upon the connecting means between the dolly and the towing vehicle whereby the weight is further transferred to the adjacent end of the latter, and in addition, secondary, and preferably (though not necessarily) tertiary sheaving means around which the lifting cable of the sling assembly extends before reversing toward the winch means of the dolly framework, the secondary sheaving means being located either coincident with but preferably adjacent and above the point of vertical rotary connection of the connecting means between the dolly and the towing vehicle such that the weight of the towed vehicle is further transferred, and the dolly further biassed rotationally downward at its point of connection with the towing vehicle.

With the foregoing considerations in view, and such other objects, purposes or advantages as may become apparent from consideration of this disclosure and specification, the present invention consists of the inventive concept embodied in the method, process, construction, arrangement of parts, or new use of any of the foregoing as herein particularly exemplified in one or more specific embodiments of such concept, reference being had to the accompanying figures in which:

FIGURE 4 is a front elevation of the dolly showing the lifting and towing sling assembly elevated and secured in out-of-use position.

FIGURE 5 is a schematic side elevation depicting the ground wheels of the castor assembly in the two diametrically swivelled positions they occupy and with the yoke raised.

In the drawings, like characters of reference designate similar parts in the several figures.

Figures 1, 2:
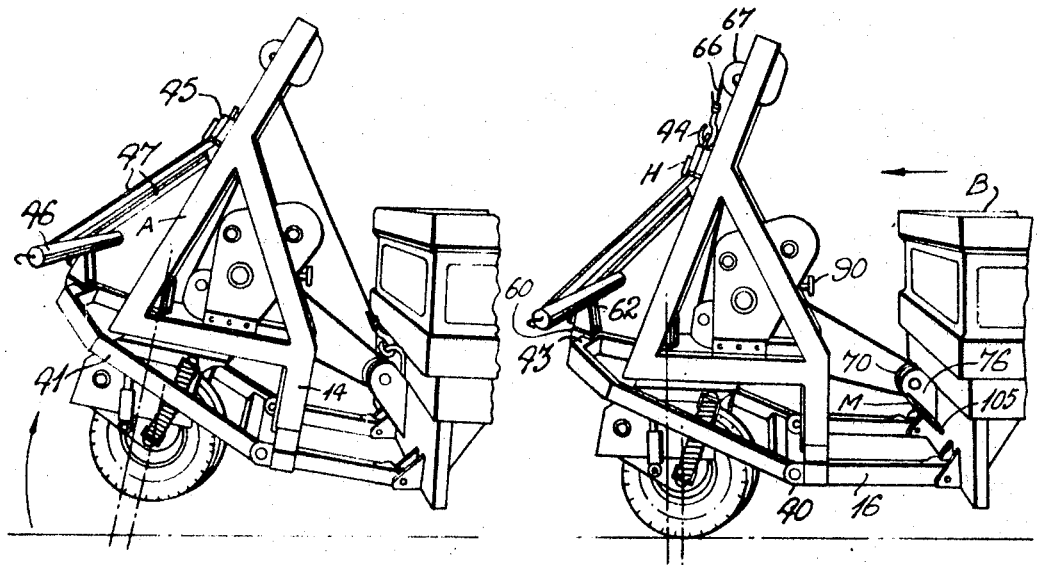
FIGURE 1 is a substantially side elevation of the present towing dolly as elevated into out-of-use transporting position.
FIGURE 2 is a view similar to FIGURE 1 but showing the dolly lowered to ground either after having been lowered from the position of FIGURE 1, or else backed up toward a disabled vehicle.

In briefest preliminary summary the herein invention may be described conceptually as one which, in a lifting and towing dolly collectively designated A, attachable to one end of a towing vehicle B, for towing another vehicle C, which has been lifted clear of ground contact by the dolly at the end adjacent thereto, and wherein the dolly is adapted for the attachment thereto of a conventional lifting and towing sling assembly collectively designated D; in combination: a framework collectively designated E, hingedly secured connecting means generally designated F between said framework and said towing vehicle, a yoke collectively designated G comprising essentially a pair of shafts pivotally connected at H to the framework, the assembly D being connected at the lower end to the substantial junction of said shaft forming said yoke, a ground wheel framework supporting castor assembly collectively designated J, means collectively designated K for raising and lowering assembly D, and out-of-use retaining means L for securing the sling assembly D in out-of-use position.

The invention also includes means generally designated M (perhaps best designated in the accompanying FIGURES 2, 6 and 7, in slightly alternative forms) for lifting the dolly rotatably upwards about the connecting means generally designated F. Lastly in summary, the invention includes the particular novel feature of the aforesaid ground wheel framework supporting castor assembly J as comprised essentially of what may be designated as a castor bearing structure N, journalled for horizontal rotation about a vertical axis, a wheel bearing structure generally designated M, journalled for limited vertical rotation about a horizontal axis in the vicinity of one end of M, to said castor bearing assembly, and on a vertical axial plane which is offset from the vertical rotary axis of the castor bearing assembly, one or a pair of wheels O journalled for rotation about a horizontal axis on the distal end of wheel bearing structure M, with the vertical rotary axial plane of said wheel being parallel with the equivalent plane upon which the wheel bearing assembly M is journalled to the castor bearing assembly N, but offset from said vertical castor bearing assembly axis upon the opposite side thereof to that upon which the wheel bearing assembly is journalled (to M) and spring suspension means operatively connected between N and M.

Having thus set forth a consistory summary, the particular embodiment of the inventive concept herein disclosed will be described in what follows wherein the aforesaid alphabetical designations may without prejudice be substituted by numerals.

The dolly collectively designated 10 comprises firstly the framework A which, in turn consists of a superstructure generally designated 11, and an understructure generally designated 12. The latter includes a horizontally disposed chassis portion 13, and a pair of downwardly projecting leg means 14 rigidly secured in right angular relationship to chassis portion 13 at 15. Rigidly secured secured to the lower end of leg means 14 and projecting horizontally rearwards is a pair of connecting bars 16 (which may reasonably be considered as forming either part of the understructure 12 or connecting means F. They are rigidly secured in right angular relationship at 17.

Superstructure 11 comprises the pair of upwardly and rearwardly inclining spaced and parallel stiles 18 connected at their apex by the cross brace 19. The aforesaid stiles are held rigidly in the indicated position by a pair of diagonal braces 20. Chassis portion 13 may be considered to comprise essentially a horizontal four sided frame embodying the side members 21, front and rear cross members 22 and 23 respectively although its is readily to be appreciated that such details may be varied considerably providing a rigid horizontal supporting structure is provided to receive and suitably secure the assembly J and the concerned parts K and M as will presently be described in detail.

Castor assembly J secured to chassis portion 13 comprises a thrust bearing housing generally designated 24 provided with wide bearing surfaces 25 of Teflon or the like at the lower end thereof to permit rigid but easy rotation of the subjacent castor assembly under offset bending stress and suspended conditions as will presently appear. To the thrust bearing is connected, at the lower end thereof, the aforesaid castor being structure N, in the form of hood 26 best illustrated in the accompanying FIGURES 9 and 10. Journalled for limiting vertical rotation about the horizontal axis 27, in underlapping and interfacing relationship with the side plates 28 of hood 26 is the foresaid wheel bearing structure M in the form of a pair of plates 29 and 29'. The pair of road contacting ground wheels O are journalled near the opposite ends of the pair of plates 29 and 29' at axis 30. Plates 29 and 29' should be united by the rear connecting plate 31 illustrated in the accompanying FIGURE 4 projecting outwardly from hood 26, and from plates 29 and 29', are boxings 32 and 33 respectively to receive the suspension means in the form of the pair of springs 34 and 34'. Conventional shock absorbers 35 and 35' are also connected to these two parts.

From the immediately preceding description of the novel castor assembly, it will be perceived that the vertical axial plane 36 upon which lies horizontal axis 27, is is offset from the vertical thrust bearing axis 37, and that the vertical axial plane 38 of horizontal axis 30 about which the ground wheels O rotate, is parallel with axis 37 but offset upon the opposite side thereof to plane 36.

A cross bar 39 connects the pair of connecting bars 16 and at each end of this cross bar, projecting forwardly, is a clevis 40. Pivotally connected to these clevises at H, is the aforesaid yoke G, the same comprising a pair of shafts 41 which extend parallel for a portion of their distance, but converge at the portions 42, to be joined at the forward end of the yoke by the short connecting piece 43.

The sling assembly D extends between the aforesaid portion 43, and the means for raising and lowering the same and yoke J, and particularly the hook 44 of such means and which is removable from the sling assembly as will presently be described. The sling assembly is again emphasised as not forming part of the present invention in and of itself. However, it is desirable to describe the same to complete this disclosure as follows.

It comprises upper and lower cross heads 45 and 46 respectively, between which cross heads extend the fender-engaging flexible slings 47, preferably in the form of wide and parallel, coplanar strips of flexible material such as rubber impregnated fabric or the like. The upper end of the portions 47 are secured between the parts 48 and 49 of the upper cross head, as by screws or rivet assemblies 50, the portion 49 being provided with an upwardly projecting centre part 50, apertured as at 51 to receive hook 44. The portion 48 is also provided with the pair of fixed hooks 52 to receive the safety chain and disabled vehicle connecting hook assembly collectively designated 53.

The lower ends of the strips 47 are fastened around the lower cross head 46 which lower cross head is preferably tubular and clamped thereto by means of the longitudinally extending semi-circular clamping plate 54. A pair of rearwardly directed hooks 55, project from the ends of the cross head 46 to receive the chain-rung portions 56 and which chain-rung portions pass behind the strips 47 to provide an additional safety factor against any failure thereof. By reference to the accompanying FIGURE 3 it will be recognized that the slings 47 extend beneath the adjacent fender 57, together with lower cross head 46 and the portion 43 while the remaining portions 58 of the chain system 53, pass underneath the vehicle C, with the bar-hooks 59 engaging the rear axle housing, or alternatively, the front suspension of the disabled vehicle C in the conventional manner whereby it would be understood that the main physical connection between the invented dolly and the disabled vehicle occurs between the hooks 59 and the hooks 55 between which the chain portions 58 extend, it being understood that (conventionally again) the chains 58 are held fast in the hooks 55, against longitudinal movement, the immediately preceding context being best illustrated in the accompanying FIGURES 3 through 5.

The lower cross head 46 is connected to portion 43 of yoke J by means of the novel sub-assembly best depicted in the accompanying FIGURES 2, 4 and 5, and shown modified immaterially in FIGURE 4. A seating block 60 is positioned centrally of the portion 43, and secured thereto as by means of the bolt 61, to permit rotation, is a box-type gusset plate 62. Against the upwardly projecting face of the said gusset plate is another plate 63 integral with a connecting block or pair of fish plates 64 which in turn are welded to cross head 46.

In the elevated and out-of-use position of the sling assembly D as illustrated in the accompanying FIGURES 1, 2 and 4, it will be seen that such sling assembly is retained on the framework and held secured in such position by means already designated L and which in fact comprise a pair of hanger-plates having each a recess 65 therein to support the upper cross head 48 between the slings 47. They are conveniently welded against the inner opposing surfaces of the box-sections which constitute the stiles 18.

Proceeding next to describe in detail the novel means for raising and lowering sling assembly D and yoke G, the same comprises, in addition to the already mentioned hook H, a cable generally designated 66 which passes over the primary sheaving means 67 at the apex of stiles 18, such sheaving means being secured in any conventional manner to cross head 49. The cable 66 proceeds downwardly in the form of the falling runs 68 and 69 (FIGURE 7) passing around a secondary sheaving means 70 projecting from towing vehicle B, the aforesaid runs being angulated through the intermediacy of the tertiary sheaving means 71. After passing around secondary sheaving means 70, cable 66 proceeds in the form of an upper return run 72, to pass around the drum 73 of the cable winch assembly or two speed dolly lifting gear winch assembly now designated collectively as 74, best illustrated in the accompanying FIGURE 8.

Secondary sheaving means 70 consists of a pulley 75 journalled between the pair of upwardly inclining supporting plates 76. Tertiary sheaving means 71 are to be understood as being mounted upon a suitable plate or supporting bars constituting part of chassis portion 13. It consists of the pulley 77 and the pair of upstanding bearing plates 78. These may if desired, alternatively be fastened to the side bearing plates 79 of the winch assembly 74.

The winch assembly 74 comprises the just mentioned side plates 79, supported as for example by means of the angle bar portions 80 in any suitable fashion to the chassis portion 13. The content extending between the plates 79 may be suitably housed over by the shrouding 81.

Drum 73 is rotated via the spur or sprocket gear 82 keyed to drum 73. Element 82 is rotated by chain 83 in turn keyed to crankshaft 84. At the opposite end of crankshaft 84 is keyed a third gear 85, which drives, through chain 86, the low speed gear 87 on low speed crankshaft 88. From a contemplation of the foregoing it will be apparent that when the crank handle 89 is connected to shaft 88, the drum 73 may be rotated at relatively high speed to wind-in or pay-out cable 66 at relatively high speed. Under load however the handle 89 can simply be pulled off the splined end of shaft 84 and applied to shaft 88. Rotary motion will now be transmitted in a speed ration reducing manner effectively through all four of the mentioned gears whereby drum 73 will be rotated relatively slowly as when it is desired to lift a disabled vehicle, or to lift the dolly itself as in the accompanying FIGURE 1 which will presently be described. Included in the assembly 74 there is provided a drum locking pawl sub-assembly collectively designated 90. This is shown in the engaged position in the accompanying FIGURE 8 with the pawl per se 91 engaging the rachet gear 92 keyed to one of the end plates of drum 73. Pawl 91 is cable of limited rotary motion on the arm 93 pivoted to the adjacent plate 79 at 94. Welded to the outer surface of the adjacent plate 79 is a pawl assembly supporting bracket 95 provided with a projecting angle stop 96 for limiting the downward travel of arm 93 under the bias of spring 97. To the projecting distal end of bracket 94 is pivotally connected at 98, and angle-bracket 99 to the horizontal distal end 100 of which said spring 97 is connected. Projecting outwardly from the adjacent plate 79 is an operating handle 101. From a contemplation of these arrangements, it will be apparent that when the handle 101 is rotated as indicated by the double headed arrow 102, from the depicted position, element 79, being rotated through an arc of approximately 180° will cause the spring 79 to move likewise, and upon snapping upwardly bring the pawl 91 into disengagement from the rachet wheel 92 and so lock the drum 73 against paying out of the cable 66.

Figure 3:
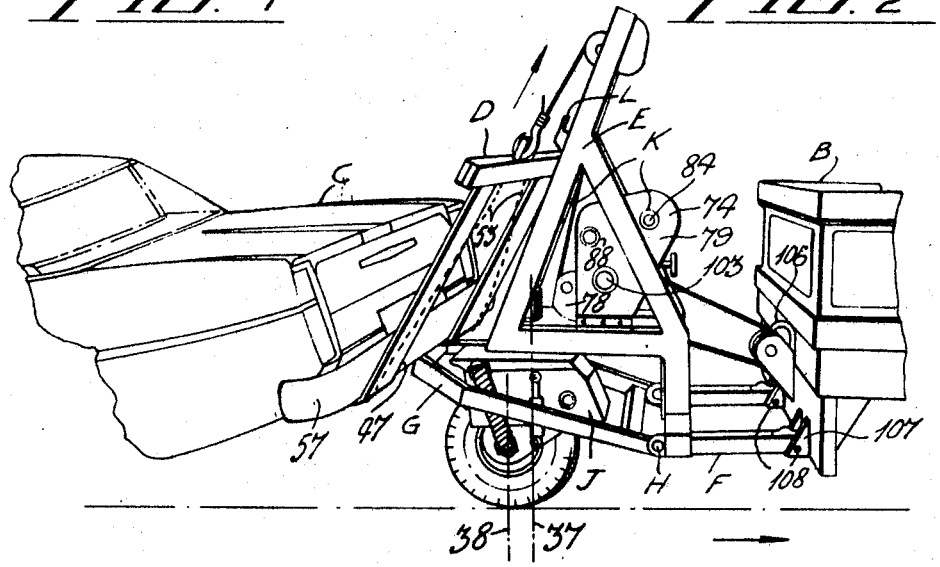
FIGURE 3 is a view substantially similar to FIGURES 1 and 2 but showing the dolly connected to a disabled vehicle having commenced to pull away with same hence the castor assembly is shown reversed.
Figure 8:
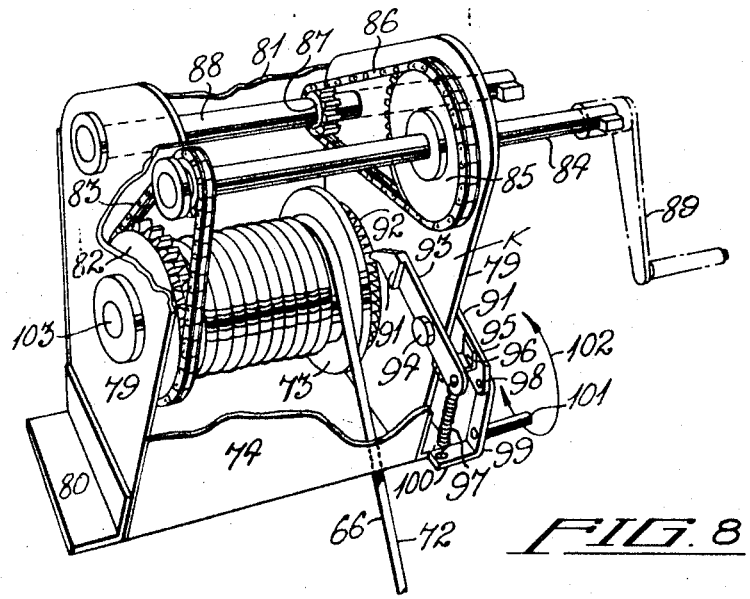
FIGURE 8 is a perspective representation of the sling assembly cable winch assembly or means for raising and lowering the same.

The axis of drum 73 is designated 103 for purposes of orientation as between the accompanying FIGURES 3 and 8.

Figure 6:
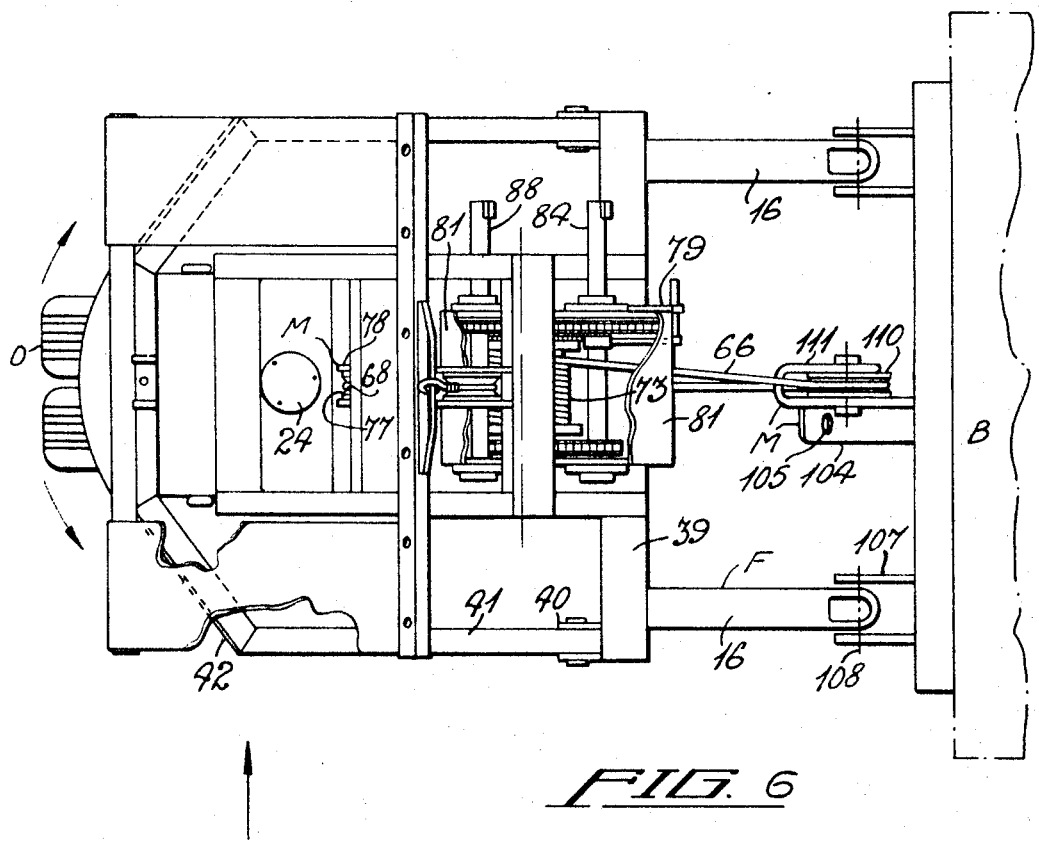
FIGURE 6 is a plan view of the present invention.
Figure 7:
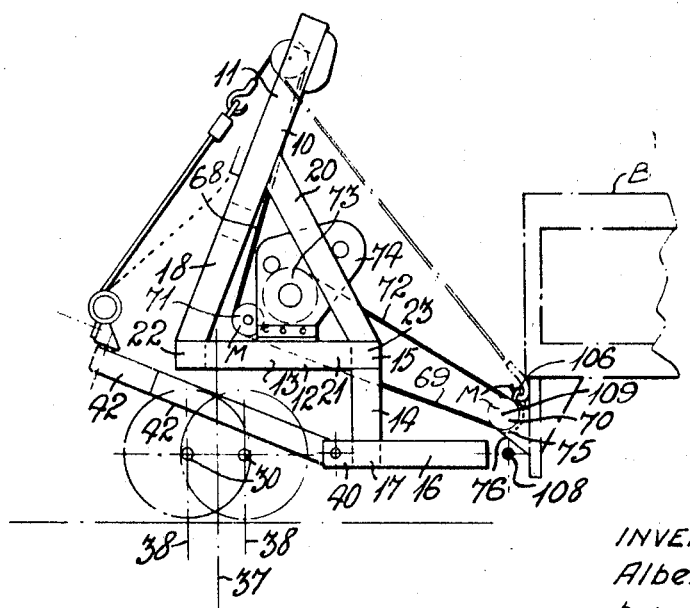
FIGURE 7 is a schematic side elevation depicting the manner of cable usage and associated parts whereby the dolly may be raised to clear the ground.

It will be observed that secondary sheaving means 76 are disposed centrally of the width of the towing vehicle B. Associated therewith, by reference to the accompanying FIGURES 2 and 6, is to be seen an outwardly projecting plate 104 provided with an aperture 105. In FIGURES 1 and 7 slightly alternative but mechanically equivalent means are shown, as also in FIGURE 3, comprising a shackle 106. But constitute equivalent forms of anchorage point for the hook 44 as presently to be described.

Connecting means 16 includes the pair of clevises 107, or any alternative form of hitch or coupling between the dolly A and the towing vehicle B such that point or points 108 (FIGURES 6 and 7) represent the actual locus of limited upward rotary motion of the dolly framework, as into the position of the accompanying FIGURE 1, in which it will be again noted that the right angular relationship between parts 14 and 16 are preserved. Although a pair of spaced connecting points 108 are indicated (and preferable), nevertheless a central connecting point can if desired be substituted with the members 16 converging in the form of a horizontal V toward vehicle B. Which ever arrangement is resorted to however it is to be noted that the axis 109 of secondary sheaving means 70 (and the pulley forming an essential part thereof) are positioned above point or points 108. It will also be noted that the plate 105, or shackle 106 is similarly positioned above point or points 108. Finally, in this context, it may be added that preferably, as indicated in the accompanying FIGURES 6 and 7, and preferably instead of the pulley 110 of the secondary sheaving means 70 being journalled between a pair of parallel and separate plates 76, each secured to the end of towing vehicle B, the fitment in which the pulley 110 is journalled may be in the form of the upwardly and outwardly inclined clevis 111 to one side of which projects the aforesaid plate 104, whereby the cable 66 may be easily unhitched without any necessity for example of disconnecting the otherwise obstructing hook 44.

Figures 9, 10:
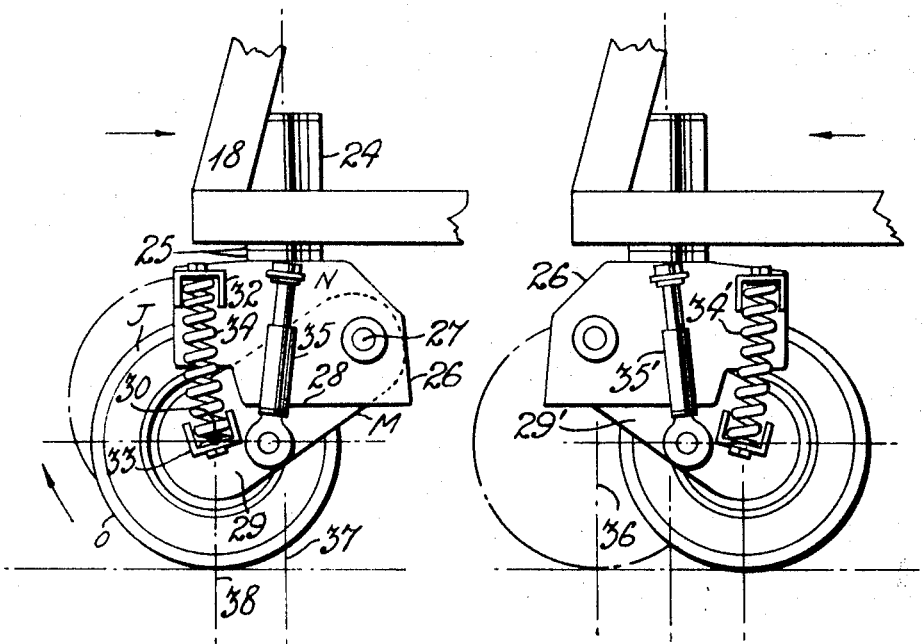
FIGURE 9 is an enlarged representation and side elevation of the ground wheel framework or dolly supporting castor assembly in towing position.
FIGURE 10 is a view similar to FIGURE 9 in backing up position, also the position assumed by the castor assembly in the position of FIGURE 1.

Having regard to all the foregoing, the operation of the invented dolly will now be described:

It has already been indicated that when being backed up towards a disabled vehicle and while connection thereto is being made via the hooks 59, the castor assembly is in the full-line position of the accompanying FIGURE 10 with respect to the thrust-bearing axis 38. When the sling assembly D is unhooked from its retaining means L and lowered so that the transverse plane of yoke G (between the shafts 41 thereof) is horizontal or substantially so (either slightly above or slightly below true horizontal) the castor assembly is not free to swivel through 180° due the size of the tires although, but for these it could do so; in other words, the dimensions of the hood 26 would not interfere with such rotation, However, 180° swivelling is not necessary in this position. When however the yoke is raised as for example in the accompanying FIGURES 2, 3, 4, 5, 7 and 9, the the castor assembly may so swivel through 180°, and does so in the pulling away positions of the accompanying FIGURES 3 and 9.

It is now importantly to be noted that what happens is as follows: Upon operation of the winch assembly 74 for the purpose of raising the sling assembly B, the weight of the lifted end of the vehicle is taken upon the primary apical sheaving assembly 67. Since this assembly is upon the opposite sides of the transverse vertical axial plane 112 (FIGURE 5) of the disabled vehicle and the sling assembly, it follows that the dolly tends to rotate clockwise, but is prevented by its connection at point or points 108 with towing vehicle B upon which therefore it exerts a downward pressure. This however only represents a part of the just mentioned clockwise rotating dynamics of the dolly in its support of the disabled vehicle C: In addition, in vitrue of the means which have been described for raising and lowering the sling assembly and yoke, a further downward effort is exerted on point or points 108 due to the positioning of the secondary and tertiary sheaving means 70 and 71—but particularly the former. The effect of the total falls of the cable 66 from the primary sheaving means 67 to the secondary sheaving means 70, and back to the winch drum 73 is such that a clockwise vertical turning moment about point or points 108 is set up which, but for the weight of the dolly would raise it clear of the ground. However, the effect of its weight, added to the weight of the lifted end of the towed vehicle supported on the sling assembly D is clearly such that the last mentioned clockwise rotary moment imposes further weight upon the point or points 108 meaning in effect that such points, and the towing vehicle B take an even greater percentage of the disabled vehicle load.

Presently it is believed that the interposition of the tertiary sheaving means 71 is desirable, including the ability which this arrangement provides for most fully enclosing the winch assembly 74. However, the cable 66 could if desired fall directly from primary sheaving means 67 to, and over, the pulley 110 of the secondary sheaving means and underneath it to the winch assembly 3 provided the same were designed to rotate in the opposite direction. Theoretically at least, secondary pulley axis 109 could be coincident with point or points 108 although efficiency would appear to be substantially reduced.

It is clearly to be understood that when the yoke G is elevated (in the vicinity of 20° of the horizontal) and sufficiently to raise the disabled vehicle, then, the castor assembly J is entirely free to rotate through 180° and does so into the pullingaway and holding position of the accompanying FIGURES 3 and 9. Particularly for use in connection with sales activities, the selling of new cars by automobile distributors and the like, the invented dolly, in view of its simplicity, low price and ease of attachment and detachment is of great utility, and several may be purchased by such a distributor for the delivery of new cars (which would take the place of what has previously been called the "disabled vehicle") by another stock car. In this case, when not being so used, the dolly may be lifted clear of the ground as depicted in the accompanying FIGURE 1. This is simply accomplished by hitching the sling assembly D onto the hooks L, disconnecting hook 44, and paying out the cable 66 crossed as shown in phantom lines in the accompanying FIGURE 1 rearwardly below the primary sheaving means 67 and connecting the hook 44 either to plate and aperture 104–105, or to the shackle 106.

Here again, it is desirable that the shackle or plate arrangements (both identified M) should be above the locus of connection 108 for the most efficient raising of the dolly about 108. On the other hand, less efficiently, the dolly can be raised by the described winching means when the secondary sheaving means are elsewhere located, and likewise the dolly raising means M. All three may even be axially coincident. However, it presently appears as if at least axis 109 should be spaced above locus 108, and that the point of connection of the hook 44 to the towing vehicle should also be above at locus 108.

Various modifications can be made within the scope of the inventive concept disclosed. Accordingly, it is intended that what is set forth herein should be regarded as illustrative of such concept and not for the purpose of limiting protection to any particular embodiment thereof, and that only such limitations should be placed upon the scope of protection to which the inventor hereof is entitled, as justice dictates.

What is claimed is:

1. In a lifting and towing dolly attached to one end of a towing vehicle, for towing another vehicle after one end of the vehicle to be towed has been lifted clear of ground contact, said dolly being adapted for the attachment thereto of a lifting and towing sling assembly, the invention which comprises, in combination, (i) a framework (ii) hingedly secured connecting means between said framework and said towing vehicle, (iii) sling assembly guide means on said framework, said sling assembly being connected to said guide means, (iv) ground wheel framework supporting means connected to said framework, (v) means for raising and lowering said sling assembly and guide means, said means for raising and lowering said sling assembly comprising sheaving and cable means connectably to said sling assembly, said sheaving means including a sheaving assembly connected to said towing vehicle, and winch means upon which said cable is wound and unwound, said means for raising and lowering said sling assembly causing at least a material part of the weight of the lifted end of the vehicle to be towed to be transferred to that side of the vertical axial plane of said ground wheel framework supporting assembly to which said dolly is connected to said towing vehicle.

2. In a lifting and towing dolly attachable to one end of a towing vehicle, for towing another vehicle after one end of the vehicle to be towed has been lifted clear of ground contact, said dolly being adapted for the attachment thereto of a lifting and towing sling assembly, the invention which comprises, in combination, (i) a framework, (ii) hingedly secured connecting means between said framework and said towing vehicle, (iii) sling assembly guide means on said framework, said sling assembly being connected to said guide means, (iv) ground wheel framework supporting means connected to said framework, said ground wheel framework supporting means being in the form of a swivelling castor-type assembly, (v) means for raising and lowering said sling assembly and guide means, said castor assembly, said framework, and said means for raising and lowering said sling assembly being so relatively disposed as to cause at least a material part of the weight of the lifted end of the vehicle to be towed to be transferred to that side of the vertical rotary axial plane of said swivelling assembly to which said dolly is connected to said towing vehicle, said castor assembly being free to swivel to 180° at least when said vehicle to be towed has been connected to said dolly and lifted clear of ground contact at the end thereof adjacent said dolly.

3. The invention according to claim 1 in which said ground wheel supporting means is in the form of a swivelling castor-type assembly, said guide means consisting essentially of shaft means substantially flanking said castor assembly, said guide means being connected to said sling assembly in the vicinity of one end of said framework, and to said connecting means at the other end of said framework, said shaft means being so spaced from said wheel supporting assembly that the same can swivel through 180° at least when said vehicle to be towed has been connected to said dolly and lifted clear of ground contact at the end thereof adjacent the said dolly.

4. The invention according to claim 1 in which said guide means are in the form of a yoke including a pair of shafts which converge at one end of said yoke, said yoke being pivotally connected to said framework in the vicinity of one end thereof, said sling assembly being connected to said yoke in the vicinity of the opposite end thereof.

5. The invention according to claim 2 in which said guide means are in the form of a yoke including a pair of shafts which converge at one end of said yoke, said yoke being pivotally connected to said framework in the vicinity of one end thereof, said sling assembly being connected to said yoke in the vicinity of the opposite end thereof.

6. The invention according to claim 1 which includes means for lifting said dolly rotatably upwards about said connecting means into out-of-use position clear of ground contact.

7. The invention according to claim 1 in which said framework includes an understructure and a superstructure, said superstructure including upwardly and rearwardly inclining supporting means, and a primary sheaving assembly constituting part of said sheaving means, in the vicinity of the apex of the said inclining supporting means.

8. The invention according to claim 2 in which said framework includes an understructure and a superstructure, said superstructure including upwardly and rearwardly inclining supporting means, and a primary sheaving assembly constituting part of said sheaving means in the vicinity of the apex of said inclining supporting means.

9. The invention according to claim 7 in which said supporting means is in the form of a pair of upwardly and rearwardly inclining stiles, said primary sheaving assembly being in the vicinity of the apex of said stiles, and sling assembly retaining means on said stiles.

10. The invention according to claim 8 in which said supporting means is in the form of a pair of upwardly and rearwardly inclining stiles, said primary sheaving assembly being in the vicinity of the apex of said stiles, and sling assembly retaining means on said stiles.

11. The invention according to claim 1 in which said winch means are mounted on said framework.

12. The invention according to claim 2 in which said means for raising and lowering said sling assembly includes a sling assembly cable winch assembly on said framework.

13. The invention according to claim 1 in which said framework comprises a superstructure and an understructure, the latter including a chassis portion, said superstructure including upwardly and rearwardly inclining supporting means, a primary sheaving assembly in the vicinity of the apex of said supporting means, constituting part of said sheaving means, and in which said ground wheel framework supporting means are in the form of a castor-type wheel supporting assembly which is connected to said chassis portion for swiveling movement about vertical thrust bearing means, the vertical rotary axial plane of each wheel of said castor wheel assembly being offset from the vertical axis of said thrust-bearing means, the vertical axial plane of said primary sheaving means in the towing position of said dolly being substantially in advance of the vertical axial plane of each castor wheel, so that the weight of the lifted end of the towed vehicle is in advance of said vertical axial plane of said primary sheaving means and whereby said dolly is overbalanced toward said towing vehicle by the weight of the lifted end of said towed-vehicle.

14. The invention according to claim 2 in which said means for raising and lowering said sling assembly includes a sling assembly gear cable winch assembly on said framework, and means associated with said dolly operable by said cable winch assembly for lifting said dolly rotatably upwards about said connecting means into out-of-use position clear of ground contact.

15. The invention according to claim 13 in which said inclining supporting means form an acute angle with said chassis portion, said understructure including downwardly extending leg means, said connecting means being operatively associated with said leg means, said winch means being in the form of a winch assembly supported by said chassis portion, said sheaving assembly connected to said towing vehicle being a secondary sheaving assembly, said secondary assembly being secured to said towing vehicle at or adjacently above the locus of connection of said connecting means to said towing vehicle.

16. The vehicle according to claim 6 which includes means for anchoring said cable to a point coincident with or above the locus of connection of said connecting means with said towing vehicle.

17. The invention according to claim 2 in which said means for raising and lowering said sling assembly and guide means include a cable and connecting means thereon, and means for anchoring the said connecting means of said cable to a point co-incident with, or above, the locus of connection of said connecting means with said towing vehicle.

18. The invention according to claim 1 in which said sheaving and cable means at least includes a primary and a secondary sheaving assembly, said primary assembly being connected to said framework, said secondary assembly being connected to said towing vehicle with said secondary sheaving assembly co-incident with or above the locus of connection of said connecting means with said towing vehicle, said winch means being secured to said framework, said cable passing around said primary and secondary sheaving assemblies to be wound and unwound by said winch means.

19. In a lifting and towing dolly attached to one end of a towing vehicle, for towing another vehicle after one end of the vehicle to be towed has been lifted clear of ground contact, said dolly being adapted for the attachment thereof of a lifting and towing sling assembly and also includes in combination (i) a framework, (ii) hingedly secured connecting means between said framework and said towing vehicle, (iii) sling assembly guide means on said framework, said sling assembly being connected to said guide means, and (iv) means for raising and lowering said sling assembly and guide means; ground wheel framework supporting means connected to said framework characterized by embodying in combination a swivelling castor bearing assembly comprising in combination a castor bearing structure journalled for horizontal rotation about a vertical axis, a wheel bearing structure journalled for limited vertical rotation about the horizontal axis in the vicinity of one end thereof, and on a vertical axial plane offset from the vertical rotary axis of said castor bearing structure, a wheel journalled for rotation about a horizontal axis on the distal end of said bearing structure, the vertical rotary axial plane of said wheel being parallel with the equivalent plane upon which said wheel bearing structure is journalled to said castor bearing structure but offset from said vertical castor bearing assembly axis upon the opposite side thereof to that on which said wheel bearing structure is journalled, and spring suspension means operably connected between said castor bearing structure and said wheel bearing structure.

References Cited
UNITED STATES PATENTS 3,127,037  3/1964  Newman _____ 214—86
3,152,704  10/1964  Russell _____ 214—86

ALBERT J. MAKAY, Primary Examiner

U.S. Cl. X.R.

280—475, 476